US009021467B2

(12) United States Patent
Choi et al.

(10) Patent No.: US 9,021,467 B2
(45) Date of Patent: Apr. 28, 2015

(54) SOFTWARE-DEFINED RADIO TERMINAL DEVICE AND METHOD FOR DISTRIBUTING AND INSTALLING RADIO APPLICATION

(75) Inventors: Seung Won Choi, Seoul (KR); June Kim, Incheon (KR); Chi Young Ahn, Bucheon-si (KR); Hyun Wook Yang, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 8 days.

(21) Appl. No.: 13/822,448

(22) PCT Filed: Dec. 20, 2011

(86) PCT No.: PCT/KR2011/009835
§ 371 (c)(1),
(2), (4) Date: May 10, 2013

(87) PCT Pub. No.: WO2012/086993
PCT Pub. Date: Jun. 28, 2012

(65) Prior Publication Data
US 2013/0243055 A1    Sep. 19, 2013

(30) Foreign Application Priority Data

Dec. 24, 2010   (KR) .................. 10-2010-0135001
Dec. 24, 2010   (KR) .................. 10-2010-0135002

(51) Int. Cl.
*G06F 9/445*   (2006.01)
*H04W 88/02*   (2009.01)
(Continued)

(52) U.S. Cl.
CPC ............. *H04W 88/02* (2013.01); *H04B 1/0003* (2013.01); *G06F 8/41* (2013.01); *G06F 8/60* (2013.01); *G06F 9/44505* (2013.01); *G06F 9/44521* (2013.01); *G06F 9/45516* (2013.01)

(58) Field of Classification Search
None
See application file for complete search history.

(56) References Cited

U.S. PATENT DOCUMENTS 7,496,739 B1 *   2/2009   Raghavan et al. ............ 717/177
7,743,115 B2 *   6/2010   Riordan ....................... 717/178
(Continued)

FOREIGN PATENT DOCUMENTS

KR   2005-0034439 A    4/2005
KR   1020070115522 A   12/2007
(Continued)

OTHER PUBLICATIONS

Ryu et al., "Smart Antenna Base Station Open Architecture for SDR Networks", Jun. 2006, IEEE, pp. 58-69; <http://ieeexplore.ieee.org/stamp/stamp.jsp?arnumber=01700072>.*
(Continued)

*Primary Examiner* — Thuy Dao
*Assistant Examiner* — Ben C Wang
(74) *Attorney, Agent, or Firm* — Ladas & Parry LLP (57) ABSTRACT

Disclosed is a software-defined radio terminal device of the present invention. The software-defined radio terminal device of the present invention is a software-defined radio terminal device configured adaptively according to a radio application, and comprises: a storage unit, a micro processor, and a baseband accelerator, wherein the micro processor delivers from the upper layer to the baseband accelerator a control command for controlling the baseband accelerator and information to be transmitted, reads from the storage unit a code including a radio controller layer delivering the information received from the baseband accelerator to the upper layer, and a baseband driver layer that enables the interface between the radio controller layer and the baseband accelerator and implements the code thereby, and is configured to load from the storage unit to the baseband accelerator at least one function block needed for implementing the radio application, and the function block loaded to the baseband accelerator is configured to include a baseband control function block that controls in real-time the baseband accelerator.

16 Claims, 9 Drawing Sheets

(51) Int. Cl.
*H04B 1/00* (2006.01)
*G06F 9/45* (2006.01)
*G06F 9/455* (2006.01)

(56) References Cited

U.S. PATENT DOCUMENTS

| | | | |
|---|---|---|---|
| 7,757,211 B2* | 7/2010 | Jordan et al. | 717/174 |
| 7,784,029 B2* | 8/2010 | Hassan et al. | 717/174 |
| 7,784,048 B2* | 8/2010 | Asai et al. | 717/178 |
| 8,171,273 B2* | 5/2012 | Bae et al. | 717/174 |
| 8,417,232 B2* | 4/2013 | Kim et al. | 717/177 |
| 8,417,234 B2* | 4/2013 | Sanding et al. | 717/178 |
| 8,488,707 B2* | 7/2013 | Hyeon et al. | 375/267 |
| 2002/0083432 A1* | 6/2002 | Souissi et al. | 717/178 |
| 2004/0098715 A1* | 5/2004 | Aghera et al. | 717/178 |
| 2005/0055689 A1* | 3/2005 | Abfalter et al. | 717/174 |
| 2005/0079890 A1 | 4/2005 | Yu | |
| 2010/0138824 A1* | 6/2010 | Cho et al. | 717/174 |
| 2010/0235827 A1* | 9/2010 | Rinne-Rahkola | 717/174 |
| 2010/0313197 A1* | 12/2010 | Cho et al. | 717/174 |
| 2011/0047539 A1* | 2/2011 | Reunamaki et al. | 717/174 |
| 2011/0088028 A1* | 4/2011 | Tofighbakhsh et al. | 717/178 |
| 2011/0202301 A1 | 8/2011 | Kim et al. | |
| 2011/0296399 A1* | 12/2011 | Tugnawat et al. | 717/174 |
| 2012/0084772 A1* | 4/2012 | Shadi et al. | 717/177 |
| 2012/0096445 A1* | 4/2012 | Berg et al. | 717/140 |
| 2013/0235798 A1* | 9/2013 | Choi et al. | 370/328 |
| 2014/0064344 A1* | 3/2014 | Choi et al. | 717/178 |
| 2014/0137082 A1* | 5/2014 | Ellis et al. | 717/124 |
| 2014/0137123 A1* | 5/2014 | Hartmann et al. | 718/102 |
| 2014/0164106 A1* | 6/2014 | Naik et al. | 717/178 |
| 2014/0164476 A1* | 6/2014 | Thomson | 709/203 |

FOREIGN PATENT DOCUMENTS

| | | |
|---|---|---|
| KR | 2009-0065329 A | 6/2009 |
| WO | 2010/026292 A1 | 3/2010 |
| WO | 2010/141448 A1 | 12/2010 |

OTHER PUBLICATIONS

Lee et al., "Software Defined Radio—A High Performance Embedded Challenge", 2005 Springer-Verlag Berlin Heidelberg, HiPEAC Nov. 17, 2005, LNCS 3793, pp. 6-26, 2005; <http://link.springer.com/chapter/10.1007%2F11587514_3>.*

Lin et al., "SODA—A Low-power Architecture for Software Radio", 2006 IEEE, ISCA'06, May 2006, pp. 1-12; <http://dl.acm.org/citation.cfm?id=1135775.1136494&coll=DL&dl=GUIDE&CFID=462092452&CFTOKEN=86030066>.*

Mueck et al., "ETSI Reconfigurable Radio System: Status and Future Directions on Software Defined Radio and Cognitive Radio Standards", Sep. 2010 IEEE, pp. 78-86; <http://ieeexplore.ieee.org/stamp/stamp.jsp?tp=&arnumber=5560591>.*

International Search Report mailed Jul. 24, 2012, PCT/KR2011/009835.

ISR mailed Jul. 24, 2012; PCT/KR2011/009833.

* cited by examiner

SOFTWARE-DEFINED RADIO TERMINAL DEVICE AND METHOD FOR DISTRIBUTING AND INSTALLING RADIO APPLICATION

TECHNICAL FIELD

The present invention relates to a software-defined radio (SDR) terminal device and a distribution and installation method of a radio application, and more particularly, to an SDR terminal device in which a radio application is independently operated in a modem chip, and a distribution and installation method of the radio application.

BACKGROUND ART

Along with the development of communication technologies, a large number of new types of radio applications have been used depending on the purpose and preferences of users. Most radio applications such as LTE (Long term Evolution), WCDMA (Wideband Code Division Multiple Access), WIMAX (Worldwide Interoperability for Microwave Access), GSM (Global System for Mobile Communications), and the like, are executed on a terminal while interacting with a modem.

In order for these radio applications to control the modem, unique commands, which a corresponding modem has, should be understood depending on modem manufacturer or model, and a module that can achieve this should be developed and applied. As a result, any radio application may only be executed in a specific manufacturer or specific modem.

In order to solve this problem, different control commands in accordance with a variety of types of modems should all be included in the application, or different execution files for each modem should be manufactured and distributed.

However, in this method, a radio application has to be optimized each time in accordance with hardware of various modems which are currently on the market, and therefore it is virtually impossible for a radio application to be operated in all terminals, and a huge workforce is required to manufacture a single radio application.

DISCLOSURE

Technical Problem

The present invention is directed to providing a software-defined radio (SDR) terminal device that may support a radio application independently of a modem chip.

The present invention is also directed to providing a distribution method of a radio application that is independent of a modem chip.

The present invention is also directed to providing an installation method of a radio application that is independent of a modem chip.

Technical Solution

One aspect of the present invention provides a software-defined radio (SDR) terminal device that is adaptively configured in accordance with a radio application, the SDR terminal device including: a storage unit; a microprocessor; and at least one baseband accelerator, wherein the microprocessor reads, from the storage unit, a code including a radio controller layer that transmits, from an upper layer to the baseband accelerator, a control command for controlling the baseband accelerator and information to be transmitted, and transmits, to the upper layer, the information received from the baseband accelerator, and a baseband driver layer that enables an interface between the radio controller layer and the baseband accelerator and executes the read code, the microprocessor is configured in such a manner that at least one function block required for implementing the radio application is loaded from the storage unit to the baseband accelerator, and the function block loaded to the baseband accelerator includes a baseband control function block that controls the at least one baseband accelerator in real time.

Another aspect of the present invention provides a distribution method of a radio application, including: creating an application package including a user-defined code that defines function blocks for implementing a specific radio application, a radio controller code that transmits, from an upper layer to the function block, a control command for controlling the function blocks for implementing the radio application and information to be transmitted and interfaces with an operating system of a terminal, and pipeline configuration metadata that describes the function blocks for implementing the radio application and connection between the function blocks; and uploading the created application package to an application distribution server.

Still another aspect of the present invention provides an installation method of a radio application which is performed in a user-defined radio terminal, the installation method including: downloading, from a distribution server, an application package including a user-defined code that defines function blocks for implementing the radio application, a radio controller code that transmits, from an upper layer to the function block, a control command for controlling the function blocks for implementing the radio application and information to be transmitted and interfaces with an operating system of a terminal, and pipeline configuration metadata that describes the function blocks for implementing the radio application and connection between the function blocks; and storing, in a storage unit of the terminal, the radio controller code and the user-defined code with reference to the pipeline configuration metadata.

Advantageous Effects

As described above, according to a software-defined radio (SDR) terminal device according to an embodiment of the present invention, the same radio application may be executed in terminals including modem chips with mutually different structures using a standard baseband API.

Also, several digital signal process algorithms required for radio digital communication may be provided to the standard baseband API in order to perform an optimized digital signal process, and therefore a modem hardware manufacturer may select implementation in a hardware or software manner in accordance with complexity of each block included in the standard baseband API or power consumption, and a radio application manufacturer may manufacture a radio application that is independent of the modem chip using the standard baseband API.

Furthermore, a user-defined type of block may be applied in order to implement a function that is not included in the standard baseband API, and therefore a variety of expansions of the standard baseband API may be made possible.

MODES OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Figure 1:
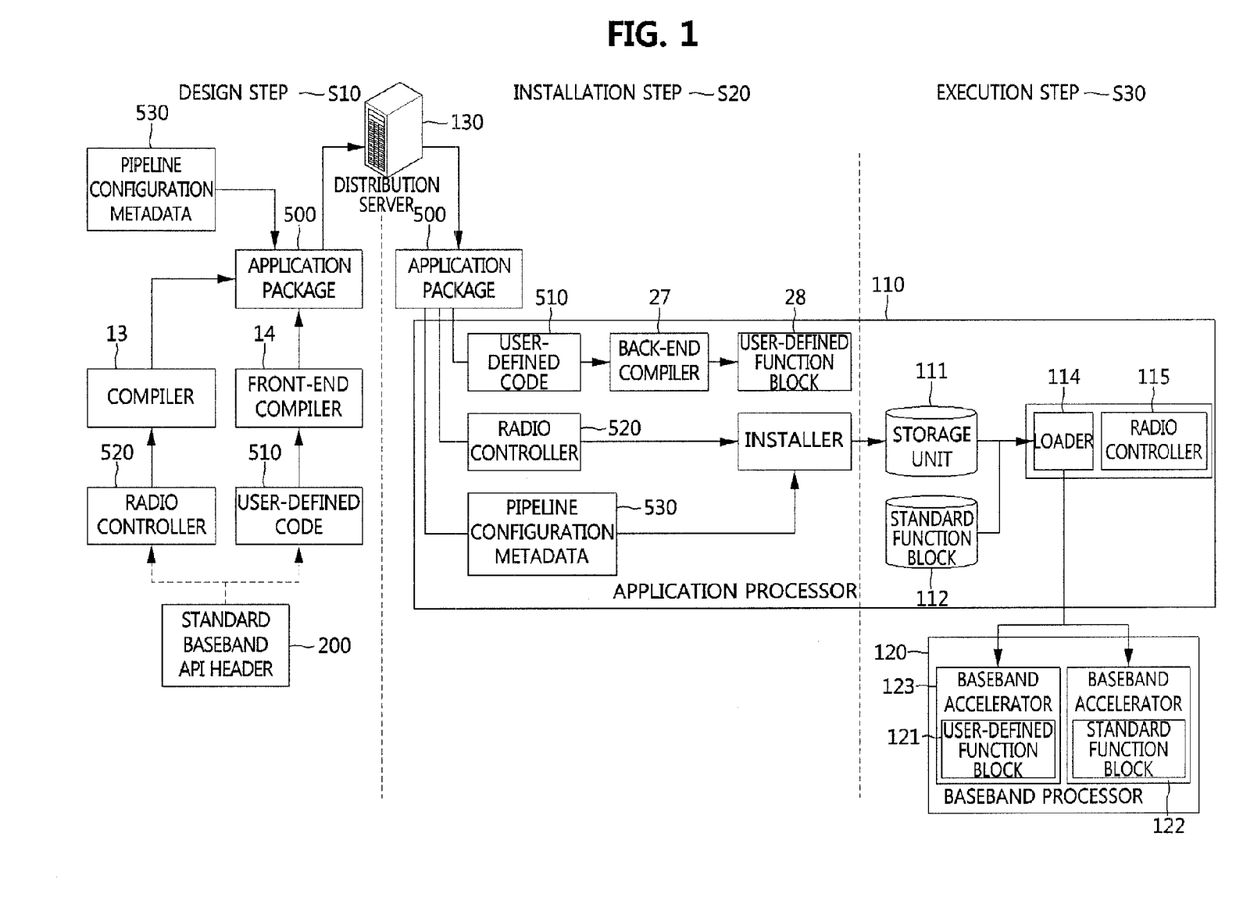
FIG. 1 is a block diagram showing the entire process in which a radio application according to an embodiment of the present invention is distributed and executed.
Figure 2:
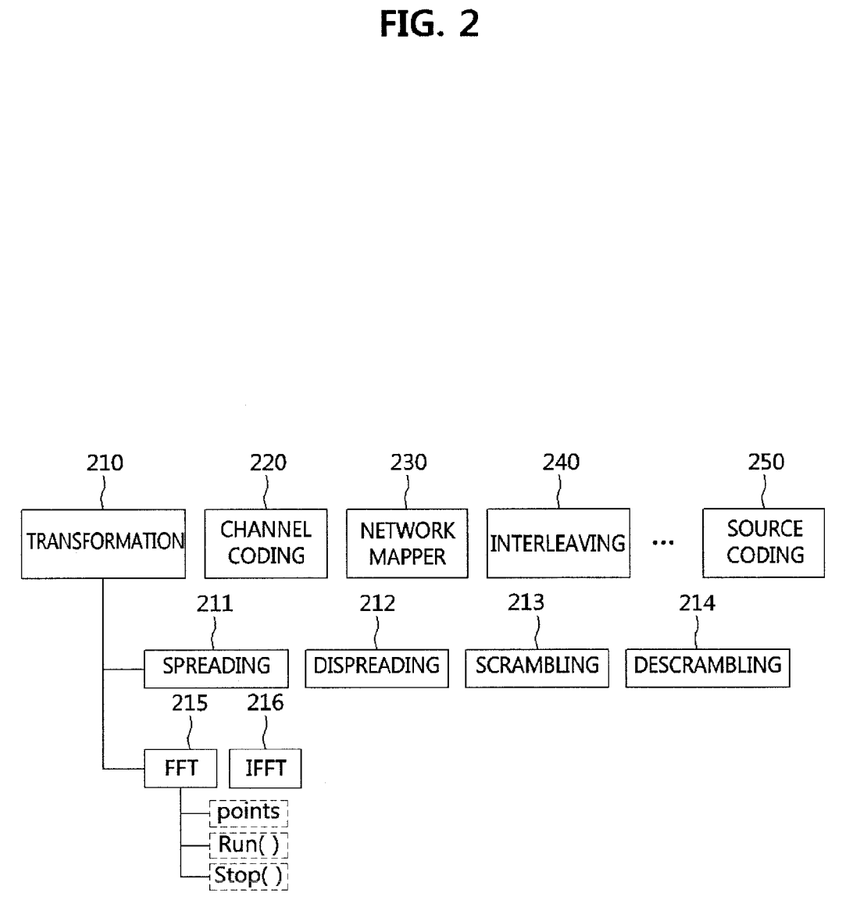
FIG. 2 is a conceptual diagram showing an example of a standard baseband interface according to an embodiment of the present invention.

FIG. 1 is a block diagram showing the entire process in which a radio application according to an embodiment of the present invention is distributed and executed, and FIG. 2 is a conceptual diagram showing an example of a standard baseband interface according to an embodiment of the present invention.

Referring to FIG. 1, a process in which a radio application according to an embodiment of the present invention is distributed and executed may include a design step S10, an installation step S20, and an execution step S30.

In the design step S10 as a step of manufacturing a radio application, a supplier of a radio application may create a radio controller code 520 for implementing a radio application, and a user-defined code 510 using a standard baseband API header 200 in which a standard baseband interface is defined, and generate a radio application package 500 through compilers 13 and 14. The generated radio application package 500 may be uploaded to a distribution server 130, and therefore the uploaded radio application package 500 may be downloaded in a terminal in which a corresponding radio application is to be implemented.

The installation step S20 is a step of downloading the application package 500 stored in the distribution server 130, and installing the downloaded application package 500 in the terminal. In this instance, the user-defined code 510, the radio controller code 520, and pipeline configuration metadata 530 which are included in the application package 500, are installed in an application processor 110. Here, when the user-defined code 510 is an intermediate representation type, a user-defined block 28 that is executable in a terminal through a back-end compiler 27 may be generated.

In the execution step S30 as a step of actually implementing the installed application, an execution file corresponding to the installed application is loaded in order to process a radio signal through the application processor 110 and the baseband processor 120 by information included in the radio application, so that actual radio communication is performed.

For example, when receiving an execution command of the radio application installed in the terminal, a loader 114 may determine which block is required for execution of the application with reference to the pipeline configuration metadata 530.

In addition, the radio controller code 520 and the user-defined block 28 are loaded in a storage unit 111 of the terminal.

In addition, the loader 114 loads the radio controller code 520 to the application processor 110, and loads a user-defined function block 121 and a standard function block 122 to a baseband accelerator 123 with reference to the pipeline configuration metadata 530.

FIG. 2 is a conceptual diagram showing an example of a standard baseband interface according to an embodiment of the present invention.

Referring to FIG. 2, the standard baseband interface is an API in which a digital signal process algorithm required for a baseband region inside a modem is standardized, and as examples of the standard baseband interface, standard interfaces 210 to 250 and standard function blocks 211 to 214 are illustrated.

As types of standard interfaces, transformation 210, channel coding 220, network mapper 230, interleaving 240, and source coding 250 may be included. In addition, as a standard function block with respect to the transformation 210, spreading 211, dispreading 212, scrambling 213, descrambling 214, Fast Fourier Transform (FFT) 215, and Inverse Fast Fourier Transform (IFFT) may be defined.

Data and properties inputting and outputting through FFT 215, which is the standard function block, a member function, and the like, may be defined.

In addition, an object-oriented design of the radio application may be made possible by granting a common property to the same type of function blocks.

Meanwhile, according to an embodiment of the present invention, a standard interface API header created in a high-level language is used as the above-described standard baseband interface. Accordingly, a radio application manufacturer may manufacture a radio application with reference to the standard interface API header.

Example of Configuration of Software-Defined Radio Terminal Device

Figure 3:
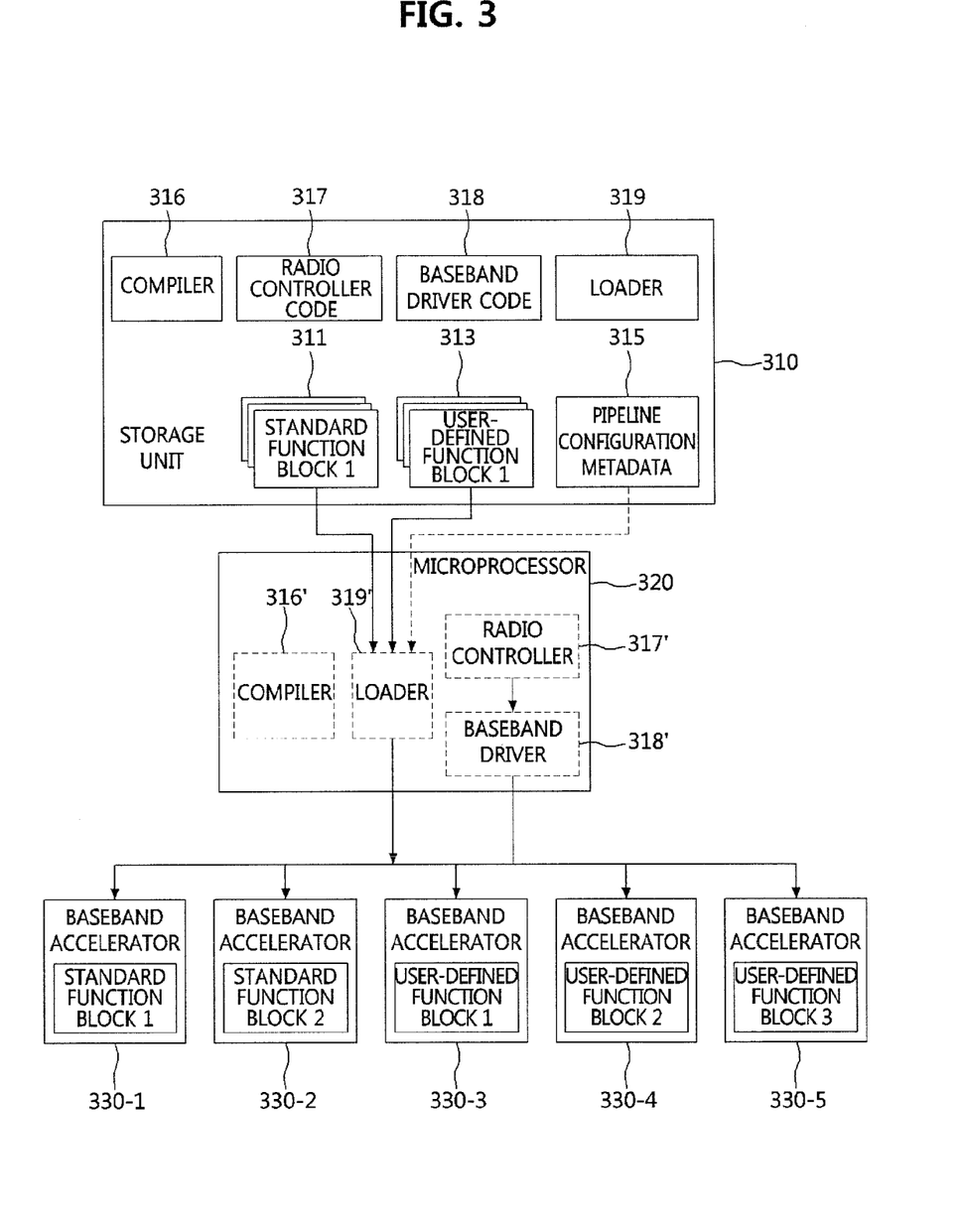
FIG. 3 is a block diagram showing a configuration of a software-defined radio (SDR) terminal device according to an embodiment of the present invention.

FIG. 3 is a block diagram showing a configuration of a software-defined radio (SDR) terminal device according to an embodiment of the present invention.

Referring to FIG. 3, the SDR terminal device according to an embodiment of the present invention may include user-defined function blocks 313, pipeline configuration metadata 315, a radio controller code 317, a baseband driver code 318, a storage unit 310 in which a loader 319 is stored, a microprocessor 320 that reads a compiler 316, the radio controller code 317, the baseband driver code 318, and the loader 319 from the storage unit 310, and a plurality of baseband accelerators 330.

Hereinafter, a configuration of an SDR terminal according to an embodiment of the present invention and connection relationship between respective components will be described in detail with reference to FIG. 3.

In the storage unit 310, a standard function block 311, the user-defined function block 313, the pipeline configuration metadata 315, the compiler 316, the radio controller code 317, the baseband driver code 318, and the loader 319 may be stored. Accordingly, the microprocessor 320 may read codes from the storage unit and execute the read codes.

In this instance, the user-defined function block 313, the pipeline configuration metadata 315, and the radio controller code 317 which are stored in the storage unit 310, may be downloaded from an application server, and installed in the storage unit 310.

In this case, the downloaded user-defined function block 313 may be a source code, an intermediate representation type of code, or an execution file.

When the downloaded user-defined function block is the source code, a compiler 316' existing in the microprocessor 320 may compile the user-defined function block 313 into a type executable in a terminal, and store the compiled function block in the storage unit 310.

When the downloaded user-defined function block is an intermediate representation type that is independent of the device, the user-defined function block 313 may be stored in the storage unit 310 without a separate conversion process. However, when the downloaded user-defined function block is loaded to the baseband accelerator 330, the downloaded user-defined function block may be converted so as to be executable in the baseband accelerator 330 by the compiler 316', and loaded to the baseband accelerator 330. In this case, the compiler 316' may be a back-end compiler.

Meanwhile, when the baseband accelerator 330 supports the intermediate representation that is independent of the device, the intermediate representation type of user-defined function block may be directly executed in the baseband accelerator 330 without a separate conversion of the intermediate representation type of user-defined function block. In this case, the standard function block may be created in the intermediate representation type.

The compiler 316 may be a back-end compiler, and the microprocessor 320 may load the compiler 316 from the storage unit, and the loaded compiler 316' may compile the user-defined function block 313 into a type executable in the terminal.

Here, the storage unit 310 may be a component including a non-volatile (NV) memory such as a flash memory and a volatile memory such as D-RAM or S-RAM, and may store the user-defined function block 313, the pipeline configuration metadata 315, the compiler 316, the radio controller code 317, the baseband driver code 318, and the loader 319. Accordingly, the microprocessor 320 may read codes to be executed from the storage unit 310 and execute the read codes.

For example, the volatile memory constituting the storage unit 310 may read, from the above-described non-volatile memory, components (radio controller layer, baseband driver layer, and the like) that should be mapped and executed, and load the read components, so that the loaded components may be executed by the microprocessor 320.

However, the non-volatile memory may be also directly mapped on a memory space of the microprocessor 320, and in this case, a code existing in the non-volatile memory may be directly executed by the microprocessor 320.

The standard function block 311 may be function blocks for supporting standard signal processing functions (for example, DFT, IDFT, FFT, IFFT, channel coding, interleaving, and the like) which are created based on the standard baseband interface defined in advance. Accordingly, the standard function block 311 may be initially installed in a terminal device according to an embodiment of the present invention, or supplied to a user through firmware or software upgrading.

The user-defined function block 313 is supplied from the radio application supplier as described above, and may be a function block that is downloaded from an application server and directly installed in the storage unit 10 by a user.

The pipeline configuration metadata 315 may be a predetermined data file that describes connection between function blocks required for implementing an application to be executed and initial values of properties that the function blocks have.

Meanwhile, the user-defined function block 313 may include baseband digital signal processing that is not implemented in the standard function block 311. That is, the standard function block 311 may be defined by the standard baseband API header 200, and the radio application supplier may define the user-defined function block 313 and the pipeline configuration metadata 315 with reference to the standard baseband API header 200.

The radio controller code 317 installed in the storage unit 310 is read and executed by the microprocessor 320, and therefore a radio controller 317' is not operated in non-real time, and when receiving a control command in accordance with the radio signal according to each radio application, the radio controller 317' may transmit the received control command to the baseband accelerator 330 using the standard baseband interface.

In addition, the radio controller 317' may be responsible for interface between a user layer and a baseband layer. That is, the radio controller 317' may receive reception data from the baseband accelerator 330, transmit the received data to a network stack (not shown), and transmit transmission data from the network stack to the baseband accelerator 330.

Meanwhile, when there is a need for transmitting context information to an upper layer, the context information may be transmitted from a corresponding function block to the upper layer through the radio controller 317'. In this instance, the upper layer may be a user application.

In this instance, the context information may use a context information interface, and the context information interface may be a predetermined interface that is required for transmitting, to the upper layer, the context information generated in a function block needing to transmit the context information by the radio controller 317'.

The microprocessor 320 may read, from the storage unit 310, a radio controller code 317 that transmits a control command for controlling the baseband accelerator 330 in accordance with an application to be executed, and execute the read radio controller code 317.

In addition, the microprocessor 320 may read, from the storage unit 310, a code 318 including the baseband driver layer, and execute the read code 318. In this instance, the baseband driver 318 may enable the radio controller 317' and the baseband accelerator 330 to be interfaced with each other.

In addition, the microprocessor 320 may re-configure the baseband accelerator 330 by downloading the user-defined function blocks 313 to the baseband accelerator 330 so that execution of various applications are executed in the terminal according to an embodiment of the present invention.

For this, as shown in FIG. 3, at least one of function blocks 311 and 313 may be configured so as to be loaded from the storage unit 310 to the baseband accelerator 330. In this instance, a function block required for algorithm execution through a loader 319' with reference to the pipeline configuration metadata 315 may be arranged in the baseband accelerator 330. The loader 319' may be a program that is loaded from the storage unit 310 by the microprocessor 320 and executed, and, included in a baseband driver 318' according to an implementation example. That is, the loader 319' may load, to the baseband accelerator 330, all standard function blocks 311 and the user-defined function block 313 that are described in the pipeline configuration metadata 315, and execute the loaded function blocks 311 and 313.

Meanwhile, the function block loaded to the baseband accelerator 330 may include a baseband control function block for controlling the baseband accelerator 330 in real-time, and in this case, the loader 319' may set a pipeline for defining an operational sequence of the loaded function blocks based on the pipeline configuration metadata 315, transmit the pipeline configuration information to the baseband control function block, and control the baseband accelerator 330 in accordance with the pipeline to which the baseband control function block is transmitted.

Example of Configuration and Distribution Method of Radio Application

Hereinafter, a configuration of a radio application for an SDR terminal device according to an embodiment of the present invention and a distribution process of the radio application will be described.

Figure 4:
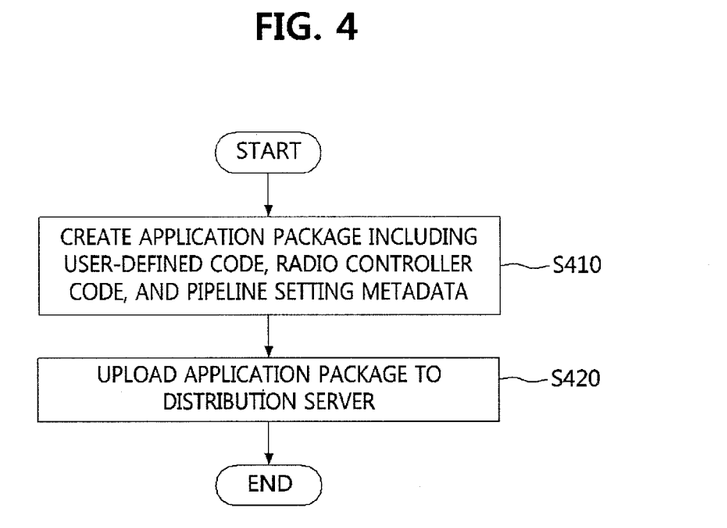
FIG. 4 is a flowchart showing a distribution process of a radio application according to an embodiment of the present invention.
Figure 5:
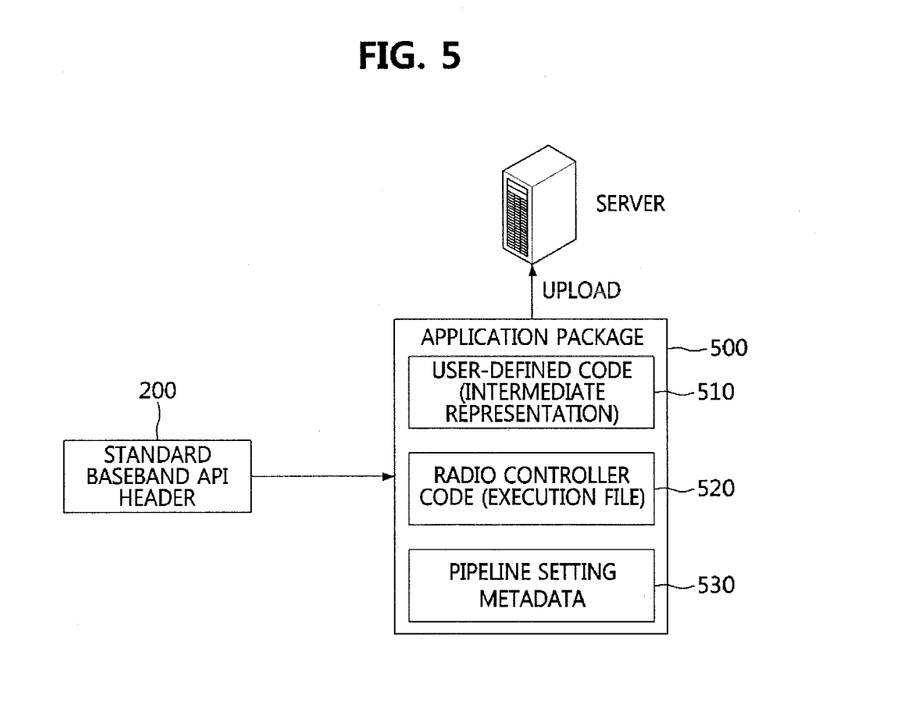
FIG. 5 is a configuration diagram showing a process in which a radio application according to an embodiment of the present invention is created.

FIG. 4 is a flowchart showing a distribution process of a radio application according to an embodiment of the present invention, and FIG. 5 is a configuration diagram showing a process in which a radio application according to an embodiment of the present invention is created.

Referring to FIG. 4, the distribution process of the radio application according to an embodiment of the present invention may include an application package creation step S410 and an application package distribution step S420.

In addition, referring to FIG. 4, the application package creation step S410 may include a step S411 of creating and compiling a user-defined code, a step S413 of creating and compiling a radio controller code, a step S414 of creating pipeline configuration metadata, and a step S417 of creating a package.

Meanwhile, referring to FIG. 5, the radio application according to an embodiment of the present invention may be created in the form of an application package 500 including a user-defined code 510, a radio controller code 520, and pipeline configuration metadata 530.

Hereinafter, with reference to FIGS. 4 and 5, each step of the distribution process of the radio application according to an embodiment of the present invention will be described in detail.

The application package creation step S410 is a step of creating a radio application executed in an SDR terminal.

The application package may include the user-defined code 510, the radio controller code 520, and the pipeline configuration metadata 530, as shown in FIG. 5.

Here, the user-defined code 510 is a code that defines function blocks required for implementing a radio application to be executed, and the radio controller code 520 is a code that is created so as to control function blocks required for implementing a corresponding radio application.

In addition, a function block defined in the user-defined code may be related to implementation of baseband digital signal processing that is not implemented in a standard function block defined in the standard baseband API header 200.

Meanwhile, the user-defined code 510 may be configured as a type of any one of a code that is directly executable in a baseband accelerator 330 of a terminal device in which the application package 500 is installed, and an intermediate representation type code.

Accordingly, when the user-defined code 510 is the intermediate representation code, the user-defined code 510 may be compiled by a front-end compiler, and when the user-defined code 510 is a directly executable code, the user-defined code 510 may be compiled by a back-end compiler.

In the radio controller code 520, a code for controlling function blocks required for implementing the radio application and enabling interface with an operating system of a device, may be implemented.

The radio controller code 520 may be a code compiled into a type that can be executed by the compiler.

Meanwhile, the pipeline configuration metadata 530 may define function blocks required for implementing a corresponding radio application and connection between the function blocks, and include description of connection between the standard function block included in the standard baseband API header 200 and the function block defined in the user-defined code 510, and description of initial values of properties that each function block has.

The user-defined code 510, the radio controller code 520, and the pipeline configuration metadata 530 may be created in the form of the application package 500 in such a manner so as to be uploaded to a server and downloaded to a terminal requiring a corresponding radio application.

The application package distribution step S420 may include uploading the application package 500 created as above to a radio application distribution server, so that the uploaded application package 500 may be downloaded from an SDR terminal requiring a corresponding radio application.

Example of Installation Method of SDR Terminal Application

Hereinafter, an installation process of a radio application according to an embodiment of the present invention will be described.

Figure 6:
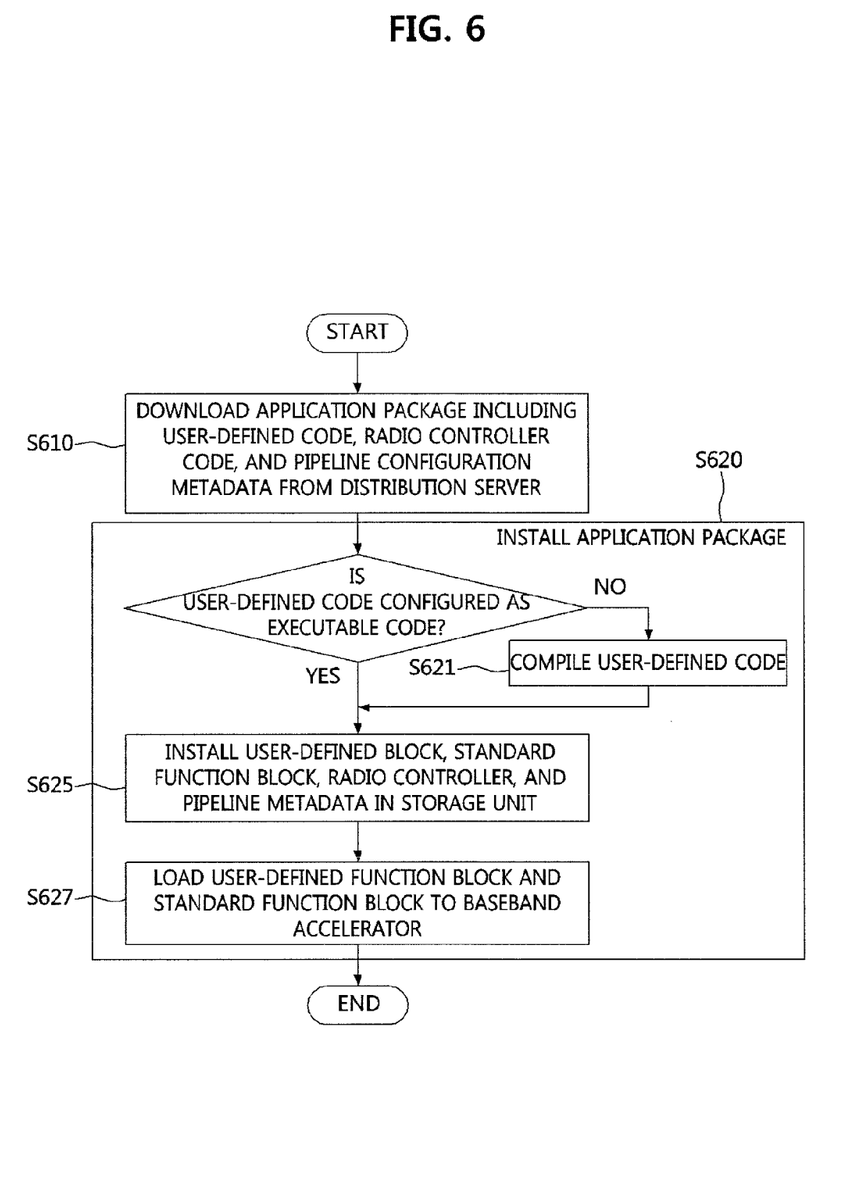
FIG. 6 is a flowchart showing an installation process of a radio application according to an embodiment of the present invention.

FIG. 6 is a flowchart showing an installation process of a radio application according to an embodiment of the present invention.

Referring to FIG. 6, the installation process of the radio application according to an embodiment of the present invention may include a step S610 of downloading an application package, and a step S620 of installing the application package.

Hereinafter, each step of the installation process of the radio application according to an embodiment of the present invention will be described in detail with reference to FIG. 6.

Step S610 of downloading the application package is a step of downloading a radio application to be executed in an SDR terminal from a distribution server, and may include downloading an application package 500 including a user-defined code 510, a radio controller code 520, and pipeline configuration metadata 530 from the distribution server to the SDR terminal.

Step S620 of installing the application package is a step of installing the application package downloaded from the distribution server in a form capable of being executed in the terminal, and may include a step S621 of compiling a user-defined code, a step S625 of installing the user-defined code in the storage unit, and a step S627 of loading the user-defined function block.

In step S621 of compiling the user-defined code, when the user-defined code 510 included in the downloaded application package 500 is a source code or an intermediate representation type code which is different from a code that can be directly executed in a baseband accelerator 330 of a terminal, the user-defined code 510 may be compiled into a code that can be directly executed in the baseband accelerator 330 of the terminal to thereby create a user-defined function block.

In addition, step S625 of installing the user-defined code in the storage unit is a step of installing, in the storage unit of the terminal, a standard function block 311 in which the pipeline configuration metadata 530 included in the downloaded application package 500, the user-defined function block included in the user-defined code 510, the radio controller code 520, and a standard command created based on a predetermined standard baseband interface are specified, with reference to the pipeline configuration metadata 530.

Step S627 of loading the user-defined function block is a step of directly loading, to the baseband accelerator 330, the user-defined function block included in the user-defined code 510 of the downloaded application package 500.

In this instance, when the user-defined code 510 is created in a form capable of being directly executed in the baseband accelerator 330, the user-defined code 510 may directly load the user-defined function block included in the user-defined code 510 to the baseband accelerator 330 without passing through step S621 of compiling the user-defined code.

Figure 7:
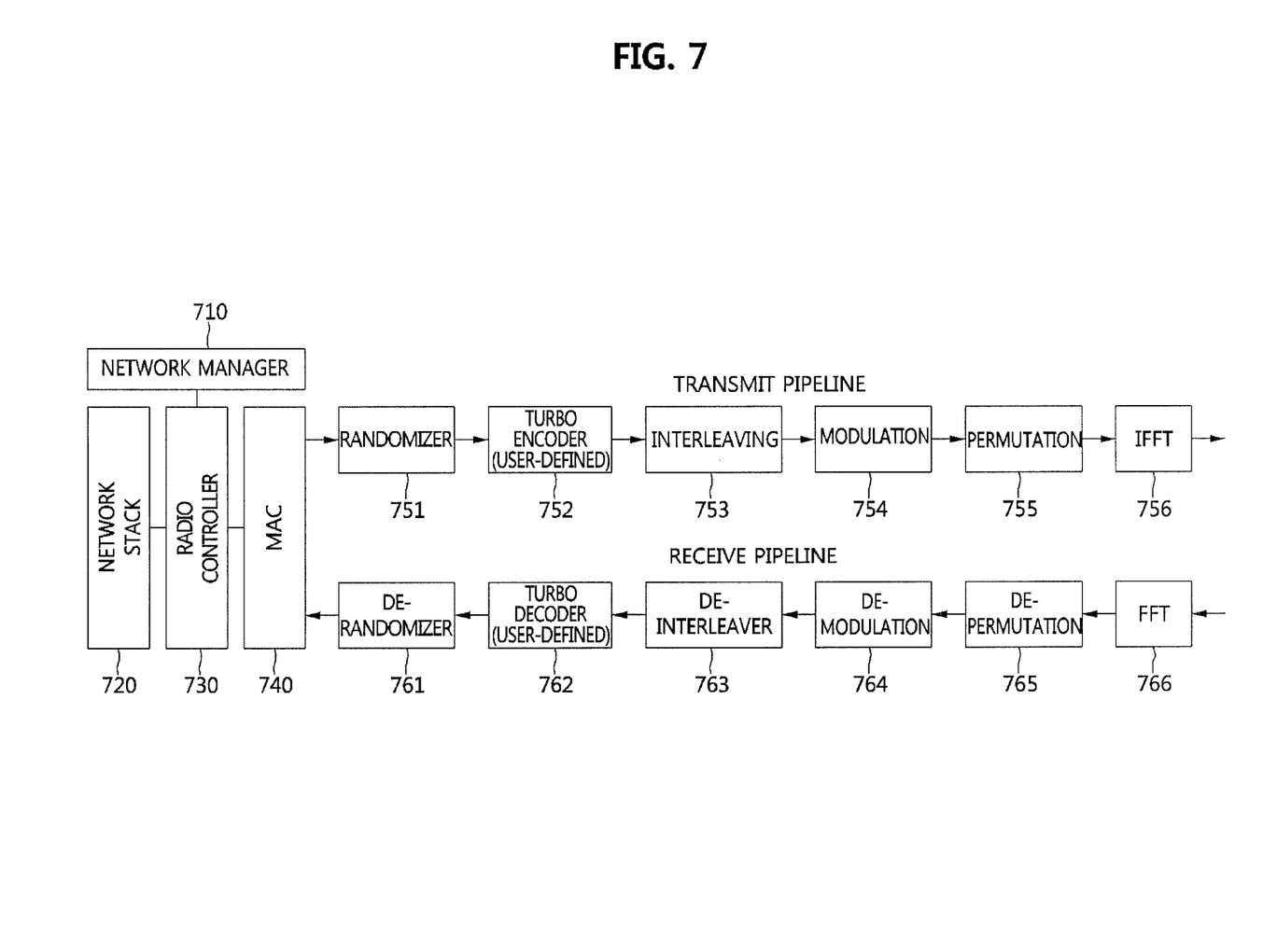
FIG. 7 is a block diagram showing an example in which a radio application according to an embodiment of the present invention is implemented and operated in a terminal.

FIG. 7 is a block diagram showing an example in which a radio application according to an embodiment of the present invention is implemented and operated in a terminal.

In FIG. 7, when a radio application of an Orthogonal Frequency Division Multiplexing (OFDM) scheme is implemented in a terminal in which a sound channel does not separately exist, a configuration of a pipeline showing an operation process in which function blocks are loaded and processed is shown.

A turbo encoder 752 and a turbo decoder 762 are implemented in the form of a user-defined function block, and other blocks 751 and 753 to 756 of a transmission pipeline 750 and other blocks 761 and 763 to 766 of a reception pipeline 760 are implemented in the form of the standard function block.

Meanwhile, a transmission pipeline may process data transmitted by an MAC 740, and a reception pipeline may process the received data and transmit the processed data to the MAC 740. Here, a radio controller 730 may be responsible for data exchange between the MAC 740 and a network stack 720.

In addition, the radio controller 730 may receive a control command of a network manager 710 mounted in an operating system by providing an interface corresponding to the control command of the network manager 710.

The network manager 710 may visualize context information of a radio signal such as transmission and reception signal quality, signal intensity, and the like, and transmit the visualized context information to a user, or transmit control information such as selection of a connected channel by a user or selection of a radio signal encryption algorithm to the radio controller 730 so as to control an intended radio signal of the user.

Figure 8:
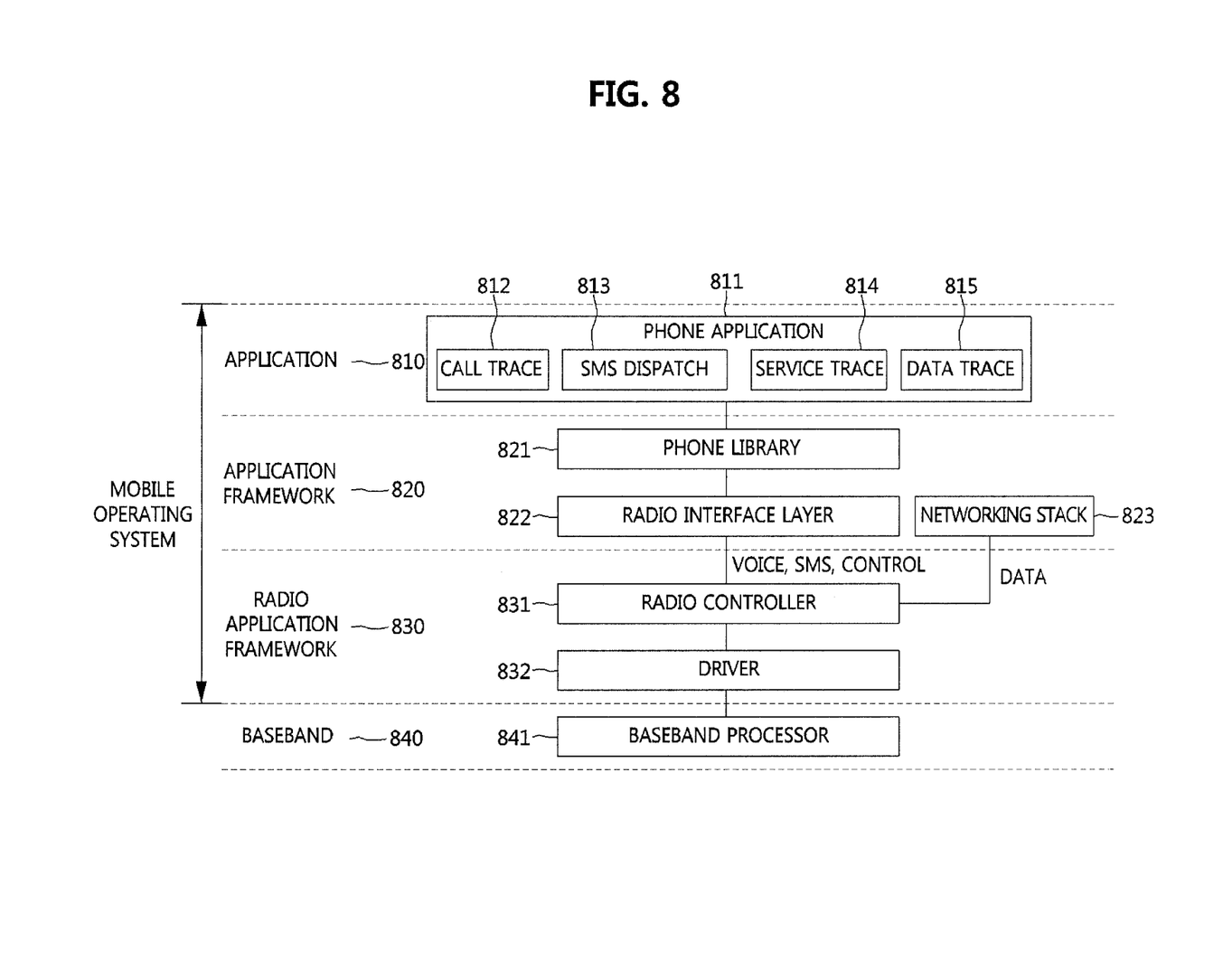
FIG. 8 is a block diagram showing an example in which a radio application according to another embodiment of the present invention is implemented and operated in a terminal.

FIG. 8 is a block diagram showing an example in which a radio application according to another embodiment of the present invention is implemented and operated in a terminal.

In FIG. 8, an example of a case in which a radio application according to an embodiment of the present invention is implemented in a terminal in which a sound channel separately exists, is shown.

Hereinafter, functions inside a mobile operating system in which a radio controller is operated in an application processor, and performed interaction will be described with reference to FIG. 8.

In general, the mobile operating system performs a phone function in which a phone application transmits and receives voice and SMS in a terminal.

In general, a phone application 811 may include a call trace function of tracing call history and informing a user of the traced call history, an SMS dispatch function 813 of receiving and sending SMS, a data tracing function 815 of informing a user of data transmission and reception usage history, and the like, as well as a voice call function. These functions of the phone application 811 may be implemented through a phone library 821 provided in the mobile operating system. The phone library 821 may transmit commands concerning control of a baseband processor 841 to a radio interface layer (RIL) 822.

A radio controller 831 may transmit signals for controlling the baseband processor 841 in accordance with a radio network control signal of the mobile operating system 800 and a sound control signal. In addition, when the signal transmitted and received to and from the baseband processor 841 is a sound signal, the radio controller 831 transmits and receives the signal to and from the phone application 811, and when the signal is data, the radio controller 831 transmits and receives the signal to and from a network stack 823.

Accordingly, a voice call function and a radio networking function may be simultaneously provided to a terminal user.

In addition, an upper layer function of a partial MAC may be included in accordance with a radio signal supported by the radio application.

Referring to FIG. 4, by connecting the radio controller 831 and the RIL 822, an application framework 820 and a radio application framework may be configured in such a manner that the baseband processor 841 is controlled through the radio controller 831 in accordance with a control command of the RIL 822.

Therefore, by connecting the radio controller prepared in accordance with each radio application to the RIL 822, a phone application 811 that is independent of the radio application may control the baseband processor 841 that is dependent of the radio application, through the radio controller 831.

Accordingly, even though the radio application is changed, the above-described functions of the phone application may be continuously performed without any change in the phone application 811.

Figure 9:
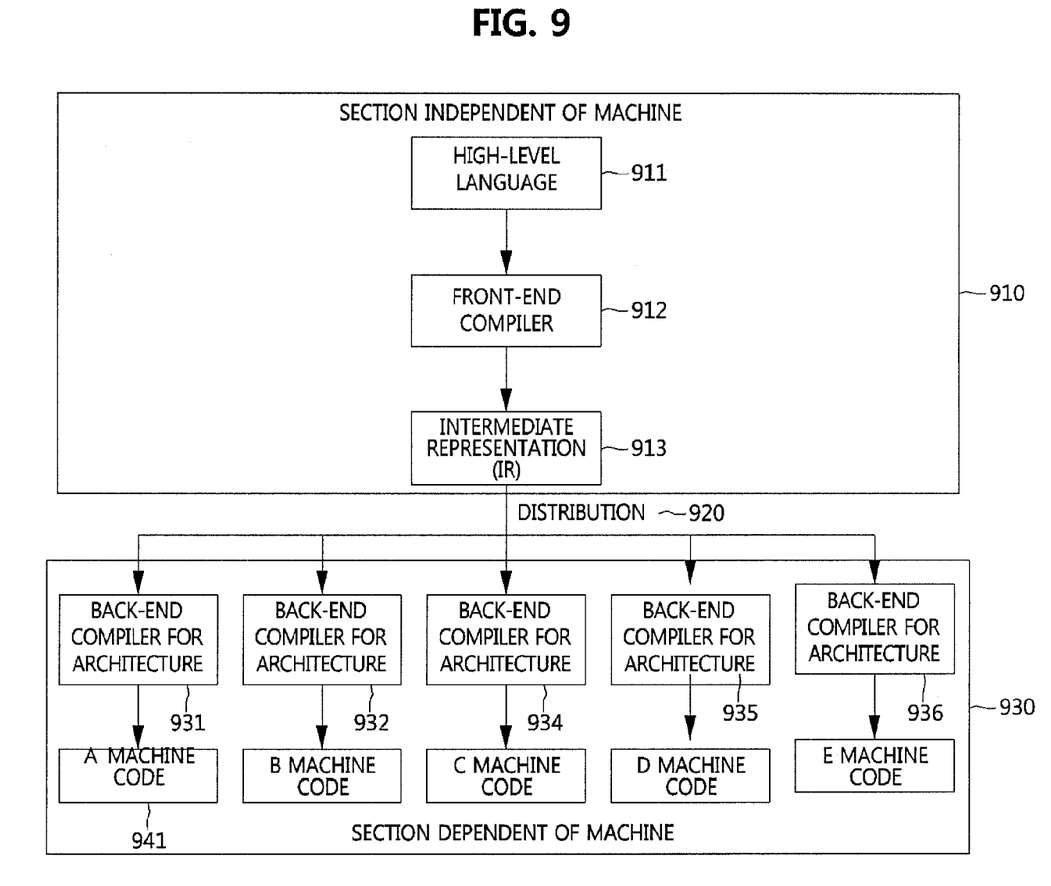
FIG. 9 is a block diagram showing a process in which an application including an intermediate representation type of user-defined code according to an embodiment of the present invention is distributed.

FIG. 9 is a block diagram showing a process in which an application including an intermediate representation type of user-defined code according to an embodiment of the present invention is distributed.

Referring to FIG. 9, a user-defined code 911 that is created at the time of manufacturing a radio application may be created in a high-level language, for example, C/C++.

The user-defined code 911 may be changed into an intermediate representation file 913 while passing through a front-end compiler 912.

The intermediate representation file 913 may be independent of modem hardware in the proximity to a machine language than the high-level language. In this manner, the created intermediate representation file 913 may be included in the radio application so as to be distributed in each terminal.

In this instance, in the installation process in the terminal, the intermediate representation file 913 may be converted into machine codes 941 to 946 that can be operated in modem hardware mounted in the terminal by back-end compilers 931 to 936. The back-end compilers 931 to 936 should create a machine language that is optimized for the modem hardware installed in each terminal, and therefore the back-end compilers 931 to 936 may be dependent of the modem hardware.

A modem hardware manufacturer may manufacture a back-end compiler that is optimized for the manufacturer's own modem, and provide the manufactured back-end compiler to a terminal company using a modem chip of the modem hardware manufacturer.

Figure 10:
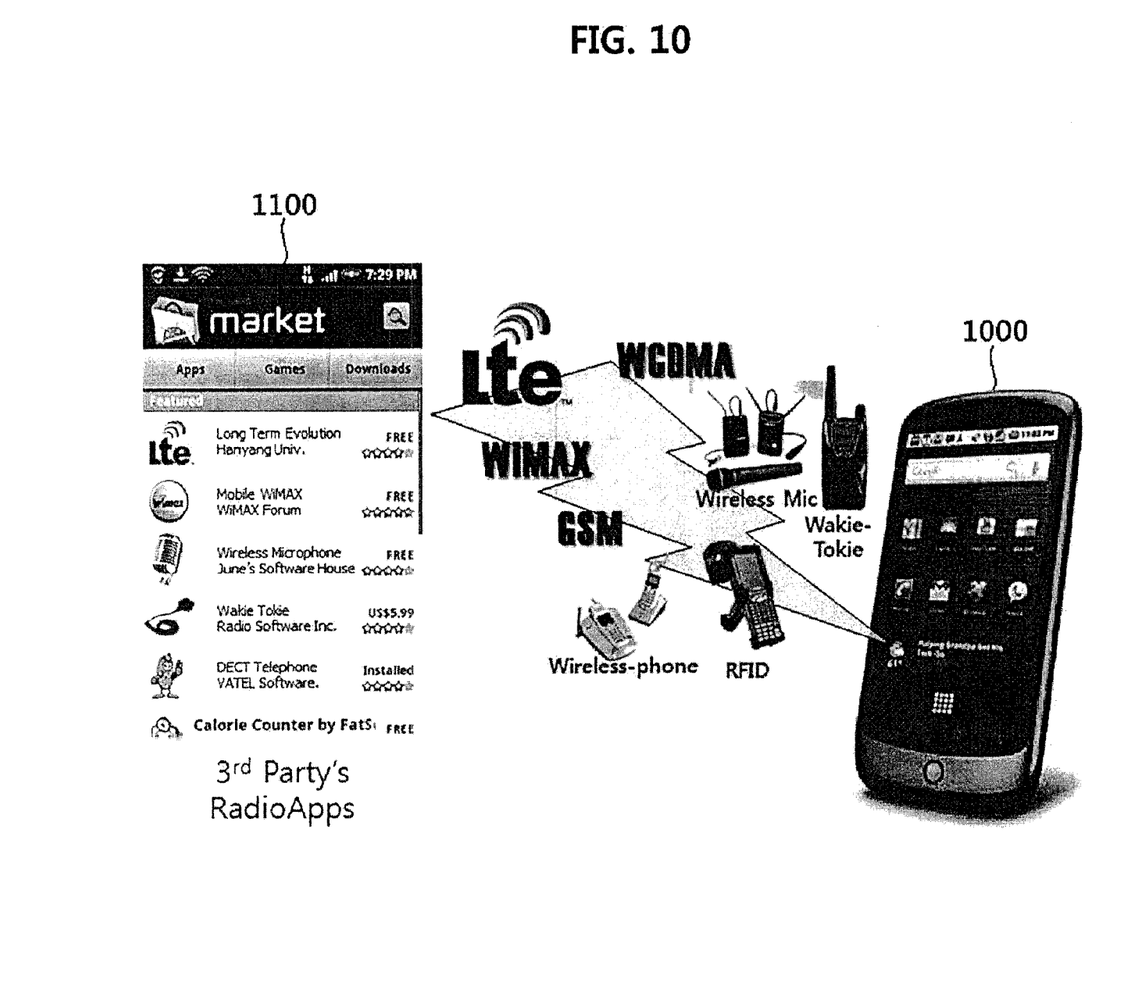
FIG. 10 is a conceptual diagram showing an example in which a radio application according to an embodiment of the present invention is available in an online market.

FIG. 10 is a conceptual diagram showing an example in which a radio application according to an embodiment of the present invention is available in an online market.

Referring to FIG. 10, an SDR terminal device 1000 according to an embodiment of the present invention may select, from an online store 1110, one of universal radio applications including LTE (Long term Evolution), WCDMA (Wideband Code Division Multiple Access), WiMAX (Worldwide Interoperability for Microwave Access), GSM (Global System for Mobile Communications), and RFID (Radio-Frequency Identification), and download and install the selected radio application, so that the installed radio application may be operated in a communication method of a corresponding application, and utilized as a radio, a wireless microphone, and a wireless phone.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A processor-implemented distribution method of a radio application, comprising:
    creating an application package including a user-defined code that defines function blocks for implementing a specific radio application, a radio controller code that transmits, from an upper layer to the function block, a control command for controlling the function blocks for implementing the radio application and information to be transmitted and interfaces with an operating system of a terminal, and pipeline configuration metadata that describes the function blocks for implementing the radio application and connection between the function blocks; and
    uploading the created application package to an application distribution server,
    wherein the application package is downloaded to a software-defined radio (SDR) terminal comprising a microprocessor and at least one reconfigurable baseband accelerator; and
    wherein the radio controller code is executed by the microprocessor, and the function blocks are loaded to the baseband accelerator in order to reconfigure the baseband accelerator,
    wherein a type of each of the function blocks corresponds to a type of any one of a standard function block in which a standard command written based on a standard baseband interface is specified, and a user-defined function block that is supplied from a supplier of the radio application.

2. The distribution method of claim 1, wherein the user-defined code is configured in the form of intermediate representation that requires a compiler for execution.

3. The distribution method of claim 1, wherein the function block defined in the user-defined code is related to implementation of baseband digital signal processing that is not implemented in a standard function block defined in a standard baseband application programming interface (API) header.

4. The distribution method of claim 1, wherein the pipeline configuration metadata includes description of connection between the standard function block defined in the standard baseband API header and the function block defined in the user-defined code, and description of an initial value of a property which each of the function blocks has.

5. A software-defined radio (SDR) terminal device that is adaptively configured in accordance with a radio application, the SDR terminal device comprising:
    a storage unit;
    a microprocessor; and
    at least one baseband accelerator,
    wherein the microprocessor reads, from the storage unit, a code including a radio controller layer that transmits, from an upper layer to the baseband accelerator, a control command for controlling the baseband accelerator and information to be transmitted, and transmits, to the upper layer, the information received from the baseband accelerator, and a baseband driver layer that enables an interface between the radio controller layer and the baseband accelerator and executes the read code,
    the microprocessor is configured in such a manner that at least one function block required for implementing the radio application is loaded from the storage unit to the baseband accelerator in order to reconfigure the baseband accelerator, and
    the function block loaded to the baseband accelerator includes a baseband control function block that controls the at least one baseband accelerator in real time,
    wherein a type of each of the function blocks corresponds to a type of any one of a standard function block in which a standard command written based on a standard baseband interface is specified, and a user-defined function block that is supplied from a supplier of the radio application.

6. The SDR terminal device of claim 5, wherein the microprocessor loads, from the storage unit, a loader for loading the function blocks from the storage unit and re-arranging the loaded function blocks, and executes the loader, based on pipeline configuration metadata defined in advance.

7. The SDR terminal device of claim 6, wherein the loader sets a pipeline for defining an operational sequence of the loaded function block based on the pipeline configuration metadata and transmits setting information of the pipeline to the baseband control function block, and the baseband control function block controls the baseband accelerator in accordance with the pipeline.

8. The SDR terminal device of claim 6, wherein the radio controller code, the user-defined function block, and the pipeline configuration metadata are downloaded from an application server, and the downloaded information is installed in the terminal.

9. The SDR terminal device of claim 8, further comprising:
a compiler that compiles an intermediate representation type of user-defined function block downloaded from the application server into a type executable in the terminal.

10. The SDR terminal device of claim 9, wherein the standard function Mock is defined in a standard baseband application programming interface (API), header.

11. The SDR terminal device of claim 10, wherein the user-defined function block includes baseband digital signal processing that is not implemented in the standard function block defined in the standard baseband APR header.

12. The SDR terminal device of claim 11, wherein the pipeline configuration metadata includes definition of connection between the standard function block defined in the standard baseband API header and the user-defined block, and definition of an initial value of a property which each of the function blocks has.

13. A processor-implemented installation method of a radio application which is performed in a software-defined radio (SDR) terminal comprising a microprocessor and at least one reconfigurable baseband accelerator, the installation method comprising:
downloading, from a distribution server, an application package including a user-defined code that defines function blocks for implementing the radio application, a radio controller code that transmits, from an upper layer to the function block, a control command for controlling the function blocks for implementing the radio application and information to be transmitted and interfaces with an operating system of a terminal, and pipeline configuration metadata that describes the function blocks for implementing the radio application and connection between the function blocks; and storing, in a storage unit of the terminal, the radio controller code and the user-defined code with reference to the pipeline configuration metadata, wherein the radio controller code is executed by the microprocessor, and the function blocks are loaded to the baseband accelerator in order to reconfigure the baseband accelerator, wherein a type of each of the function blocks corresponds to a type of any one of a standard function block in which a standard command written based on a standard baseband interface is specified, and a user-defined function block that is supplied from a supplier of the radio application.

14. The installation method of claim 13, wherein, when the user-defined code is not a code that is directly executable in a baseband accelerator of the terminal, the storing includes compiling the user-defined code into a code executable in the baseband accelerator, and storing the compiled code in the storage unit.

15. The installation method of claim 13, wherein the function block defined in the user-defined code is related to implementation of baseband digital signal processing that is not implemented in a standard function block defined in a standard baseband application programming interface (API) header.

16. The installation method of claim 15, wherein the pipeline configuration metadata includes description of connection between the standard function block defined in the standard baseband API header and the function block defined in the user-defined code, and description of an initial value of a property which each of the function blocks has.

* * * * *